(12) United States Patent
Shah et al.

(10) Patent No.: US 12,405,821 B2
(45) Date of Patent: Sep. 2, 2025

(54) SYSTEM AND METHOD FOR DETERMINING CRITICAL SEQUENCES OF ACTIONS CAUSING PREDETERMINED EVENTS DURING APPLICATION OPERATIONS

(71) Applicant: Microsoft Technology Licensing, LLC, Redmond, WA (US)

(72) Inventors: Mitansh Rakesh Shah, Seattle, WA (US); Mahdi Rahmani Hanzaki, Toronto (CA); Wayne Matthias Roseberry, Redmond, WA (US); Guilherme Augusto Kusano Schick, New Westminster (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 17/957,655

(22) Filed: Sep. 30, 2022

(65) Prior Publication Data

US 2024/0111577 A1  Apr. 4, 2024

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01); *G06F 2209/501* (2013.01)

(58) Field of Classification Search
CPC .................................................. G06F 9/4881
See application file for complete search history.

(56) References Cited

U.S. PATENT DOCUMENTS

| 11,231,986 | B1 | 1/2022 | Silakov |
| 2020/0334093 | A1* | 10/2020 | Dubey ................. G06F 18/23 |
| 2023/0306271 | A1* | 9/2023 | Venugopal Minimol ................ G06Q 10/06316 |

OTHER PUBLICATIONS

Hilbert, et al., "Extracting Usability Information from User Interface Events", ACM Computing Surveys, ACM, New York, NY, US, vol. 32, No. 4, Dec. 1, 2000, pp. 384-421.
International Search Report and Written Opinion received for PCT Application No. PCT/US2023/031093, mailed on Dec. 11, 2023, 17 pages.

(Continued)

*Primary Examiner* — Charlie Sun
(74) *Attorney, Agent, or Firm* — NovoTechIP International PLLC

(57) ABSTRACT

A system and method to collect an actions list of action sequences in an application leading to a predetermined resulting event, create pairs of the action sequences, apply a fitting alignment to the action sequence pairs to create fitted action sequence pairs, wherein non-matching data between fitted action sequences of each pair is replaced with gaps to ensure that the first and second fitted action sequences are of equal length and are aligned with one another with the gaps being located at index positions the fitted action sequences corresponding to index positions of non-matching data, and delete data, for each of the fitted action sequence pairs, corresponding to the gaps to create a critical sequence of actions for each of the fitted action sequence pairs representing, respectively, common actions of the fitted action sequences of each of the fitted action sequence pairs leading to the predetermined resulting event.

20 Claims, 7 Drawing Sheets

(56) References Cited

OTHER PUBLICATIONS

Murali, et al., "Scalable Statistical Root Cause Analysis on App Telemetry", arxiv.org, Cornell University Library, 201 Olin Library Cornell University Ithaca, NY 14853, Mar. 17, 2021, 10 pages.
International Preliminary Report on Patentability received for PCT Application No. PCT/US23/031093, mailed on Apr. 10, 2025, 10 pages.

* cited by examiner

Action Sequence Pair 410

Action Sequence 1:    ABCBDEFIJ

Action Sequence 2:    BCBBFGHI

Corresponding Fitted Action Sequence Pair 420

Fitted Action Sequence 1:    `ABC_BDEF__IJ`

Fitted Action Sequence 2:    `_BCBB__FGHI_`

Critical Sequence for the Action Sequence Pair 430:

BCBFI

FIG. 4

SYSTEM AND METHOD FOR DETERMINING CRITICAL SEQUENCES OF ACTIONS CAUSING PREDETERMINED EVENTS DURING APPLICATION OPERATIONS

BACKGROUND

In the course of running computer applications, a technical problem exists in that many undesirable events can occur, such as crashes, hangs, deteriorated operation and error states of the applications. In order to optimize the applications, it is important to determine whether certain action sequences can lead to these undesirable events. However, current arrangements for determining this are extremely slow and cumbersome. For example, as part of user interface (UI) or application programming interface (API) level testing to determine the cause of crashes of various applications of Microsoft Office™, vast amounts of synthetically produced test telemetry is collected. This telemetry includes sequential lists of actions (i.e., actions lists) undertaken by a testing agent as the Office™ applications' functionality is exercised. In addition to these lists of actions, data about when a crash occurs is collected and can be correlated with the lists of actions. As a result, the actions from each individual testing run leading up to a crash can be collected. However, there can be thousands of instances where the test system exercised the application and caused a particular crash. The exact set of steps that lead to the crash may be different between each of those instances and partially overlapping in others. It is both inefficient and often inaccurate to require a human investigator to sift through the many actions lists to derive a generalized notion about the way or ways in which the crash under examination can be triggered.

Hence, there is a need for technical solutions regarding improved systems and methods of determining sequences of actions that cause occurrence of predetermined events during application operations.

SUMMARY

In an implementation, a system is provided including a processor and a machine-readable media storing instructions which, when executed by the one or more processors, cause the processor to collect a plurality of actions lists, each action list being comprised of an action sequence of actions performed by an application on the processor leading to a predetermined resulting event pertaining to the application, create a plurality of pairs of the action sequences, each pair of action sequences being comprised of a first action sequence and a second action sequence, for each pair of action sequences, apply a fitting alignment to create fitted action sequence pairs, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs, and delete data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

In another implementation, a method is provided for collecting a plurality of actions lists, each action list being comprised of an action sequence of actions performed by an application on the processor leading to a predetermined resulting event pertaining to the application, creating a plurality of pairs of the action sequences, each pair of action sequences being comprised of a first action sequence and a second action sequence, for each pair of action sequences, applying a fitting alignment to create fitted action sequence pairs, respectively, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs, and deleting data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

In another implementation, a computer readable tangible storage media is provided on which are stored instructions that when executed cause a programmable device to perform functions of collecting a plurality of actions lists, each action list being comprised of an action sequence of actions performed by an application on the processor leading to a predetermined resulting event pertaining to the application, creating a plurality of pairs of the action sequences, each pair of action sequences being comprised of a first action sequence and a second action sequence, for each pair of action sequences, applying a fitting alignment to create fitted action sequence pairs, respectively, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs, and deleting data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 depicts an example of determining a critical sequence for a pair of action sequences, in accordance with the aspects of the present disclosure.

DETAILED DESCRIPTION

Figure 1A:
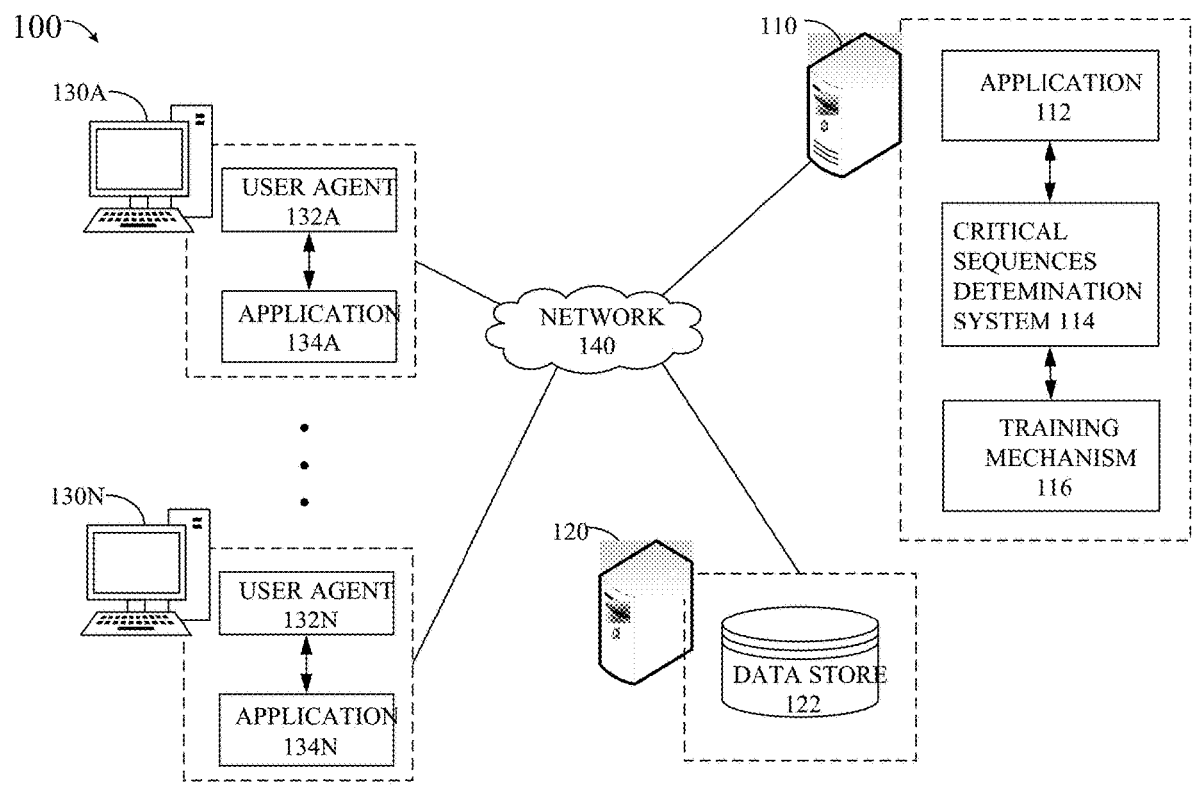
FIG. 1A depicts an example system upon which aspects of this disclosure may be implemented.

This description is directed to providing novel implementations to determine critical sequences of actions causing predetermined events, such as a crash, during application operations. By way of non-limiting example, the present disclosure provides a technical solution for solving a technical problem of determining the cause of predetermined events by providing an implementation of comparing testing telemetry sequences (e.g., actions lists obtained from UI or API testing telemetry) at scale to be able to deliver summarized action sequences that indicate how the crash can be triggered based on the sequence telemetry collected. It is noted that, although the following description is primarily directed to examples regarding determining critical sequences as to how a crash of an application occurred, the disclosure is not limited to only determining critical sequences for such crashes, but, instead, can be applied to determining critical sequences for a wide variety of predetermined actions that occur in testing computer applications, for example, a hang of the application, performance degradation of the application, error states of the application, etc. In other words, the present disclosure can be used to determine critical sequences involving the operation of applications on computers in any situation where a series or sequence of actions leads to a specific event, noting that the event may be undesirable, such as a crash, or desirable, such as successful completion of solving a particular problem or puzzle, or winning a game.

As noted above, the present disclosure is particularly directed to a technical solution of determining one or more critical sequences extracted from analyzing a plurality of action sequences (i.e., actions lists) which have led to a certain result, such as a crash of the computer application. In the following description, a crash will be used as an example of the result under study in a UI testing telemetry analysis (i.e., the crash being the "predetermined event" for which the cause is under study). To this end actions lists from all crashes with the same crash signature are first collected for analysis. Each action in the actions lists contains a plurality of attributes as part of the telemetry schema. In other words, the actions themselves are multi-dimensional actions. It is noted that each actions list, as the term is used in the present disclosure, is a list of individual actions taken in a particular order (i.e., sequence) to form a sequential actions list. These actions lists will also be referred to as "action sequences" or "sequences of actions" or, simply, "sequences" throughout this disclosure, noting that each of these terms refers to a group, or list, of individual actions taken in a particular sequence leading to a particular result.

Each actions list leading up to the crash is then trimmed to the last N actions leading up to a crash. This is undertaken to normalize the dataset being examined and to reduce runtime complexity by focusing on the most important actions, i.e., actions closest to the crash time. The number of recent actions, N, can be set at any desired number, for example 10, to begin with, and can be amended, if desired, to optimize for the telemetry under review.

After the set of actions lists is accumulated, it can be broken down into pairs of actions lists for subsequent fitting alignment analysis, as will be discussed below. After this pairing of actions lists, a pairwise fitting alignment is conducted across the complete set of actions, as will be discussed below with reference to FIGS. 3 and 4. Essentially, this pairwise fitting alignment examines the entire corpus of the actions lists under study by conducting a pairwise fitting on every possible pair of actions lists. This yields two equal length fitted action sequences where the same data across the same action sequences is in the same index. Also, non-matching data has a gap inserted in the action sequence with the non-matching data to ensure that the data in the two action sequences of the pair is aligned at each index of the two action sequences. The fitting provides a way for the application to determine where there may be extraneous actions in the sequence from one run to another. Determining which sequences are critical to causing the crash is dependent on eliminating such extraneous actions, as will be discussed.

Next, as will be discussed below with regard to FIGS. 3 and 4, for every index in the respective action sequences of the action sequence pairs that a gap has been inserted in either of the action sequences being compared, that index is deleted from both sequences. This leaves the algorithm with the critical sequence of actions required to cause the crash based on data from the two action sequences being compared. If the length of the critical sequence returned is zero, there is no relevant similarity between the two action sequences in the pair being examined in how the crash was exercised.

Once critical sequences have been determined for each of the action sequence pairs, the frequency and length of these pairwise critical sequences across the complete set of action sequences is calculated to determine which are the most occurring and most important ways to exercise the application to generate the crash. These two metrics are used to calculate an importance score for each critical sequence. The list of critical sequences is then returned to a user in a predetermined order, for example, a descending importance score order. It is noted that while two metrics are used in this particular implementation, other metrics or heuristics could be used instead of frequency and length to determine importance, if the disclosure is applied in a different context. For example, the prevalence of a particular type of action/event within a critical sequence may be important in certain other contexts and may be used as a basis for determining an importance score.

The implementations discussed herein have the technical advantage of being an important step forward in the area of testing telemetry of computer applications, and any related field involving analyzing sequences of data generated in running a computer application, because they deliver valuable insights to a user in a minimal amount of time. The insights provided include a display of one or more sets of action sequences of actions that are likely to have generated the crash, or other event, and are likely to recreate the crash or event. This allows software engineers to use UI testing telemetry at scale to quickly determine how to reproduce a crash, or other event under study, and narrow the scope of their investigation at the code level for issues that lead to the crash or event, and, as such, provides a step forward in development operations (DevOps) for this field. This directly reduces engineering costs, due to reduced investigation time. It also increases the resolution rate of events such as crashes and reduces the mean time to resolution of crashes or other events under study in the product. This improves the quality of the product being sold to customers and their satisfaction with the product.

As used herein, the terms "application," and "software application" may refer to any software program that provides options for performing various tasks. The term "action," "feature" or "application feature" may refer to any command or action offered by an application for performing a task. The term "action sequence" may refer to a series of sequence of actions performed with the application for performing a task. The term "critical sequence" may refer to sequences of actions common to at least a pair of such action sequences leading to the predetermined type of event, with extraneous actions, which are not common to the pair(s) of such action sequences, removed.

FIG. 1A illustrates an example system 100, upon which aspects of this disclosure may be implemented. The system 100 may include a server 110, which may itself include an application 112, a critical sequence determination system 114 and a training mechanism 116. While shown as one server, the server 110 may represent a plurality of servers that work together to deliver the functions and services provided by each engine or application included in the server 110. The server 110 may operate as a shared resource server located at an enterprise accessible by various computer client devices such as client devices 130A-130N. The server 110 may also operate as a cloud-based server for critical sequence determination services for one or more applications such as application 112 and/or application 134.

The server 110 may include and/or execute a critical sequence determination system 114, which may monitor telemetry logs collected from users' use of an application such as the application 112 or 134 and may analyze the collected telemetry logs to identify action sequences which have resulted in a predetermined type of event under study, such as crashes, to determine critical sequences. The critical sequence determination system 114 may examine the identified action sequences that have led to the predetermined event and analyze them in a pairwise manner, as will be discussed in detail with regard to FIGS. 1B-5 to determine which action sequences are critical sequences for the predetermined event to occur, and, among such critical sequences, which ones are the most important in terms of occurring more often among a group of action sequences that lead to the predetermined event being tested.

One or more ML models implemented by the critical sequence determination system 114 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage.

As a general matter, the methods and systems described herein may include, or otherwise make use of one or more ML models to optimize the generation of critical sequences using the elements of the critical sequence determination system 114. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in action sequences. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models or analyzing telemetry logs, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 may include a server 120 which may be connected to or include the data store 122 which may function as a repository in which databases relating to training models, telemetry logs and/or critical sequences may be stored. Although shown as a single data store, the data store 122 may be representative of multiple storage devices and data stores which may be accessible by one or more of the critical sequence determination system 114, training mechanism 116, and applications 112/134.

The client devices 130A-130N may be connected to the server 110 via a network 140. The network 140 may be a wired or wireless network(s) or a combination of wired and wireless networks that connect one or more elements of the system 100. Each of the client devices 130A-130N may be a type of personal, business or handheld computing device having or being connected to input/output elements that enable a user to interact with various applications (e.g., application 112 or application 134). Data from user's interactions with the various applications may be collected in the form of telemetry logs and used by the critical sequence determination system 114 to analyze action sequences leading to a predetermined event, and determine critical sequences within a plurality of such action sequences for causing the predetermined event. One or more of the client devices 130A-130N may be utilized by one or more users to review, revise and/or approve the determined critical sequences for use in testing and optimizing the application under test. Examples of suitable client devices 130 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIG. 6.

One or more of the client devices 130A-130N may include a local application 134. The applications 134A-134N may be software programs executed on the client device that configures the device to be responsive to user input to allow a user to perform various functions within the applications 134A-134N. Data relating to each of the user's interactions with the applications 134A-134N may be collected and stored in telemetry logs. Examples of suitable applications include, but are not limited to, a word processing application, a spreadsheet application, a presentation application, a communications application, and the like. Applications 134A-134N may also be representative of an application used to review, and analyze critical sequences.

In some examples, the application a user interacts with and from which telemetry data is collected is executed on the server 110 (e.g., application 112) and provided via an online service. In some implementations, web applications communicate via the network 140 with a user agent 132A-132N, such as a browser, executing on the client devices 130A-130N. The user agent 132A-132N may provide a user interface that allows the user to interact with the application 112.

Figure 1B:
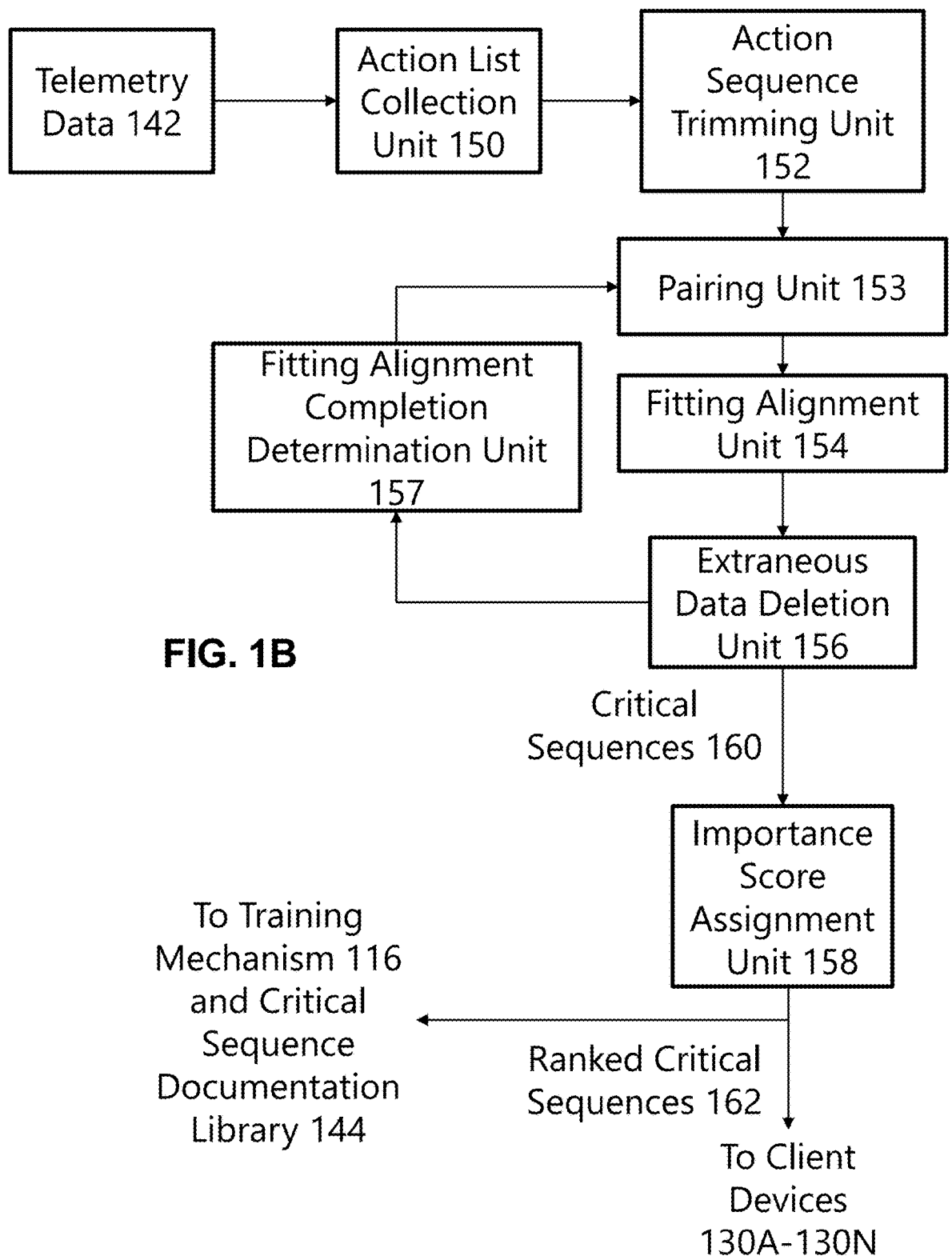
FIG. 1B depicts an example data flow between some elements of an example system upon which aspects of this disclosure may be implemented.

FIG. 1B depicts an example data flow between some of the elements of the example system 100. In FIG. 1B, the critical sequence determining system 114 includes an action list collection unit 150, an action sequence trimming and pairing unit 152, a fitting alignment unit 154, a extraneous data deletion unit 156 and an importance score assignment unit 158. The action list collection unit 150 collects one or more actions lists of a plurality of action sequences of actions performed by an application run on a processor leading to a predetermined resulting event pertaining to the application (e.g., a crash, hang, deterioration in performance or error state of the application). The action sequence trimming and pairing unit 152 trims each of the collected plurality of action sequences to a predetermined number of the last N actions of each of the collected plurality of action sequences prior to applying the fitting alignment to each of the collected plurality of action sequences.

Still referring to FIG. 1B, after trimming the action sequences, the action sequence trimming unit 152 trims each of the action sequences to the last N actions leading up to a crash. This is undertaken to normalize the dataset being examined and to reduce runtime complexity by focusing on the most important actions, i.e., actions closest to the crash time. The number of recent actions, N, can be set at any desired number, for example 10, to begin with, and can be amended, if desired, to optimize for the telemetry under review.

Next, the pairing unit 153 creates pairs of action sequences from the actions list, each pair of action sequences being comprised of a first action sequence and a second action sequence, as shown in FIG. 4, for example (as will be discussed below). The fitting alignment unit 154 applies a fitting alignment to create a plurality of fitted action sequence pairs, respectively, wherein each of the fitted action sequence pairs includes a first fitted action sequence and a second fitted action sequence having equal lengths to one another, as shown in FIG. 4, for example. In this fitting alignment, non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs, as also discussed in detail below with reference to FIG. 4.

Continuing to refer to FIG. 1B, after the fitting alignment the fitted action sequences output from the fitting alignment unit 154 are passed to the extraneous data deletion unit 156 which deletes data, for each of the fitted action sequence pairs, corresponding to the gaps in either of the first and second fitted action sequences. This permits creation of a critical sequence of actions for each of the fitted action sequence pairs representing, respectively, common actions of the first and second fitted action sequences of each of the fitted action sequence pairs leading to the predetermined resulting event. This is also discussed in more detail below with reference to FIG. 4. This operation is performed for all of the pairs of collected action sequences in the actions lists, resulting in a plurality of critical action sequences 160 as outputs of extraneous data deletion unit 156. More specifically, after the extraneous data deletion unit 156 determines a critical sequence 160 for a particular fitted action sequence pair, the fitting alignment completion determination unit 157 determines if any more action sequences remain to be paired by the pairing unit 153 and processed with units 154 and 156. If more action sequences remain for pairing and processing, the fitting alignment completion determination unit 157 activates the pairing unit 153 to pair the next set of action sequences from the entire body of collected action lists. This operation continues until the fitting alignment completion determination unit 157 determines that all action sequences in the entire body of collected action lists have been paired by the pairing unit 153, subjected to a fitting alignment by the fitting alignment unit 154 and subjected to deletion of extraneous actions by the extraneous data deletion unit 156 to determine critical sequences.

Once the extraneous data deletion unit 156 creates and outputs the critical sequences 160, the importance score assignment unit 158 of FIG. 1B analyzes the outputted critical sequences to determine how many different critical action sequences exist for the plurality of the fitted action sequence pairs and to determine how many of the plurality of critical action sequences are identical to one another for different ones of the plurality of fitted action sequence pairs. Once this determination is made, the importance score assignment unit 158 applies importance scores, respectively, to the critical sequences based on frequency of occurrence of each of the determined critical sequences within the plurality of fitted action sequence pairs to rank critical sequences based on frequency of occurrence within the total group of collected action sequences, thereby providing an output of ranked critical sequences 162. This outputted ranked critical sequences 162 can then be provided as an output of the critical sequence determining system 114 to the client devices 130A-130N and to the training mechanism 116 and a critical sequence documentation library 144 (see FIG. 2).

Figure 2:
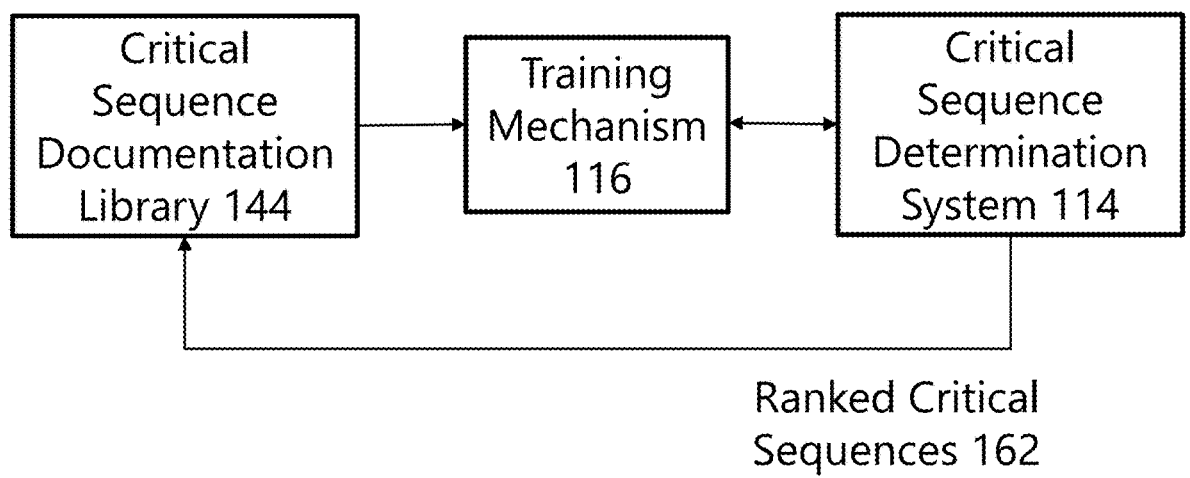
FIG. 2 depicts how one or more machine-learning (ML) models used by a critical sequence determining system may be trained, in accordance with the aspects of the present disclosure.

FIG. 2 depicts how one or more ML models used by the critical sequence determining system 114 may be trained, in accordance with the aspects of the present disclosure. As shown in FIG. 2, the ranked critical sequences 162 output from the critical sequence determining system 114 are applied to the training mechanism 116. These ranked critical sequences 162 are also applied to the critical sequence documentation library 144, which stores ranked critical sequences 162 from previous critical sequence determining operations. In addition to receiving the ranked critical sequences 162 from a current operation, the training mechanism 116 also receives ranked critical sequences 162 for previous testing operations from the critical sequence documentation library 144. This allows the training mechanism to analyze both current and prior ranked critical sequences using known machine learning tools such as discussed above with reference to FIG. 1A to develop a deeper intelligence about the correlations between actions taken in the application and crashes or other predetermined events which occur to reduce the domain of options and improve the accuracy for engineers to investigate to optimize the application.

Figure 3:
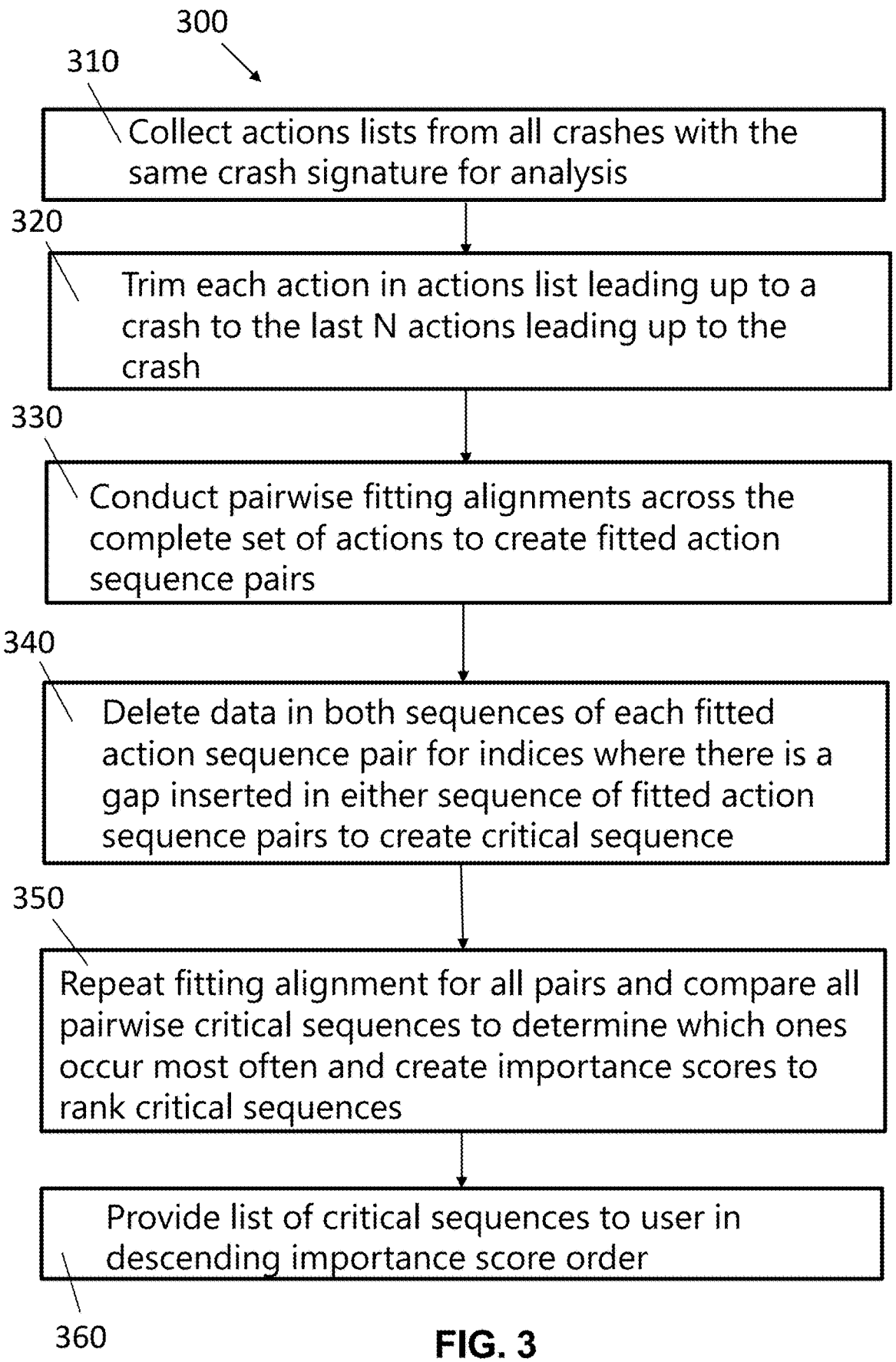
FIG. 3 is a flow diagram showing operations for determining critical sequences of actions causing predetermined events during application operations, in accordance with the aspects of the present disclosure.

FIG. 3 is a flow diagram showing operations for determining critical sequences of actions causing predetermined events, in this example a crash, during application operations, in accordance with the aspects of the present disclosure. In particular, FIG. 3 is a flow diagram depicting an exemplary method 300 for determining critical sequences causing crashes or other predetermined events during the running of software applications being tested. One or more steps of the method 300 may be performed by a critical sequence determination system such as shown in FIG. 1. It is noted that although FIG. 3 is directed to determining critical sequences for causing a crash, the steps set forth in FIG. 3 can be used to determined critical sequences for any sequence of actions leading to any type of predetermined event, whether the event is undesirable or desirable.

The method 300 begins with step 310 by collecting actions lists from crashes with the same crash signature for analysis. Once the actions lists are collected, the action sequences in these actions lists are trimmed in step 320 to the last N actions leading up to the crash, and then the trimmed action sequences are paired into pairs of the action sequences. As shown in FIG. 4, an exemplary action sequence pair 410 (noting that, in most instances, a very large number of such pairs would exist in a typical UI telemetry testing operation) is comprised of a first Action Sequence 1 (ABCBDEFIJ) and a second Action Sequence 2 (BCBBFGHI), both of which resulted in a crash of the application. It is noted that, in the example of FIG. 4, the actions are each identified by a single letter for simplicity of explanation. In most applications, however, each action includes multiple attributes, and, as such, each action with be multi-dimensional. As an example of this, in actions performed in various applications in Microsoft Office™, each action can include six attributes, specifically, action type (e.g., click, hover, etc.), object name, automation ID, control type (e.g., button, pane, etc.), class name and process name (e.g., PowerPoint™, Excel™, etc.).

In step 330, after the action sequences have been trimmed and paired in step 320, pairwise fitting alignments are conducted for each of the individual pairs across the complete set of actions in the actions lists to create fitted action sequence pairs. An example of this is shown in FIG. 4 as the fitted action sequence pair 420 which is made up of a first Fitted Action Sequence 1 (ABC_BDEF_IJ) and second Fitted Action Sequence 2 (_BCBB_FGHI_). As can be appreciated from FIG. 4, the first Action Sequence 1 (ABCBDEFIJ) and a second Action Sequence 2 (BCBBFGHI) of the action sequence pair 410, both of which resulted in a crash of the application, are of unequal length. The first Fitted Action Sequence 1 (ABC_BDEF_IJ) and second Fitted Action Sequence 2 (_BCBB_FGHI_) of the corresponding fitted action sequence pair 420, on the other hand, have gaps inserted at indices where non-matching data exists, where necessary, so that the fitted action sequences will both be of equal length and will have matching actions aligned with each other. For example, in comparing Fitted Action Sequence 1 with Fitted Action Sequence 2, the first index position of Fitted Action Sequence 1 shows action A whereas Fitted Action Sequence 2 has a gap inserted at the first index position since the data in the Action Sequence 2 does not match the data in the first index position of the Action Sequence 1. On the other hand, once the gap is placed in the first index position of the Fitted Action Sequence 2, then the action B in the second index position of both Fitted Action Sequence 1 and Fitted Action Sequence 2 match. This fitting alignment is performed for the entire lengths of Action Sequence 1 and Action Sequence 2 so that the respective corresponding Fitted Action Sequence 1 and Fitted Action Sequence 2 will be of equal length with gaps located at areas where the actions do not match between the Action Sequence 1 and Action Sequence 2.

Once the fitted action sequence pairs have been aligned in step 330, in step 340 data in both aligned sequences of each fitted action sequence pair are deleted for indices where there is a gap inserted in either sequence of fitted action sequence pairs. In other words, as shown in FIG. 4, at the first index position of Fitted Action Sequence 2, where a gap has been inserted due to the non-match with Fitted Action Sequence 1, the data of action A is deleted. Carrying this data deletion operation out across all twelve index positions of Fitted Action Sequence 1 and Fitted Action Sequence 2 results in a critical sequence 430 (BCBFI) for the original action sequence pair 410, as shown in FIG. 3. This critical sequence represents the critical actions that the Action Sequence 1 and Action Sequence 2 have in common which led to the crash, with the extraneous actions, which did not contribute to the crash, removed.

In the course of carrying out steps 310-340 over a plurality of action sequences in a normal UI telemetry testing operation, several different critical sequences will typically be generated from performing the steps on different pairs of action sequences. In order to rank the importance of these different critical sequences, in step 350 all of the pairwise critical sequences that have been determined are compared to determine which ones occur most often and to create importance scores to rank critical sequences. These rankings can be based on any criteria or parameter which is determined to be important for the particular application, for example, frequency of occurrence of the critical sequence, the length of the critical sequence, the prevalence of a particular action/event within the critical sequence, a predetermined level of importance for particular actions among a plurality of possible actions, etc. Then, in step 360, a list of critical sequences is provided to one or more client devices 130A-130N, such as shown in the left side of FIG. 1A, in a predetermined order, for example, in descending importance score order.

Figure 5:
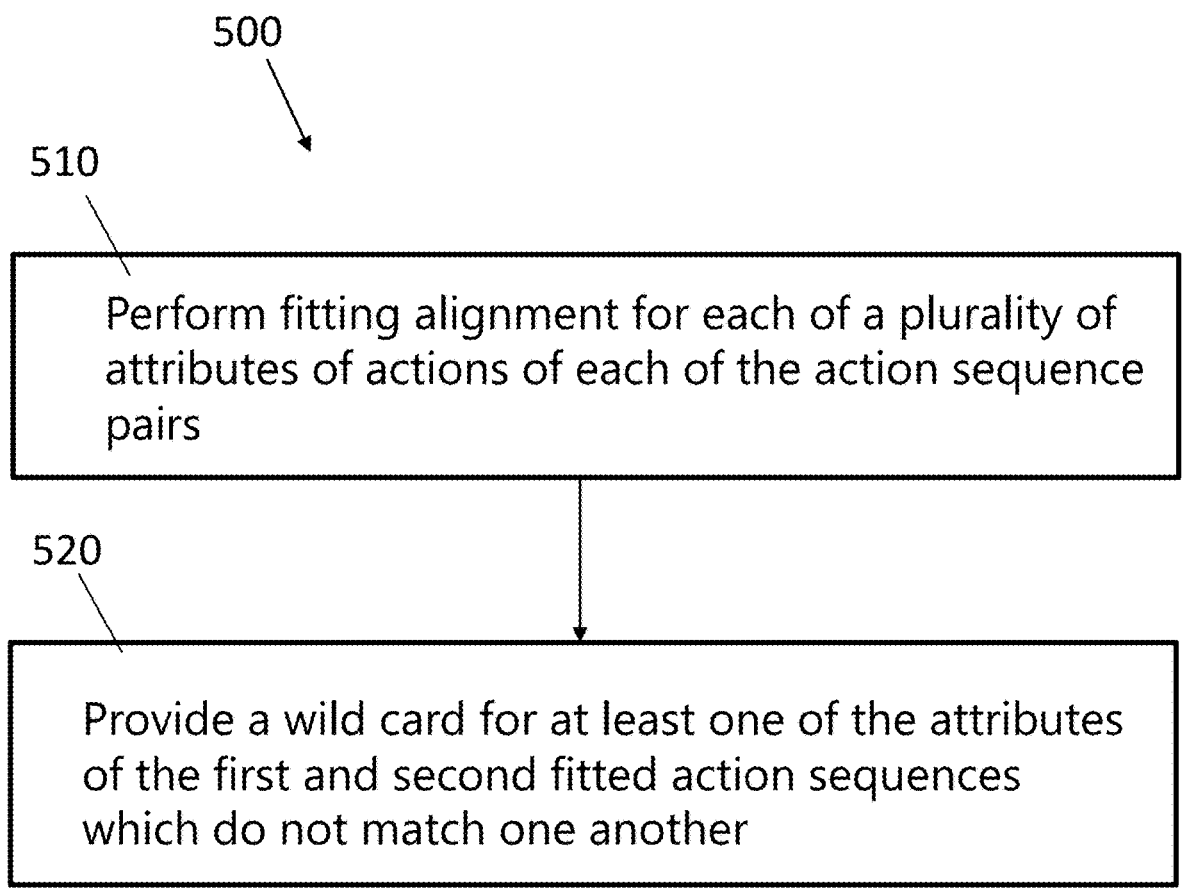
FIG. 5 is a flow diagram showing operations for providing a wild card for non-matching attributes of multi-dimensional actions of an application, in accordance with aspects of the present disclosure.

FIG. 5 is a flow diagram showing operations for providing a wild card for non-matching attributes of multi-dimensional actions of an application, in accordance with aspects of the present disclosure. Specifically, returning to the original problem of determining critical sequences for predetermined events, such as crashes, for a large amount of UI telemetry data, the algorithm must work for multi-dimensional data since each action has multiple attributes. Therefore, the algorithm discussed above with regard to a single letter representing a single action in the application under test must be expanded for this purpose by matching each action across these multiple attributes instead of seeking to match singular letters. As shown in step 510 of FIG. 5, the fitting alignment can be performed for each of a plurality of attributes of each action of each of the action sequence pairs. To this end, if the number of attributes for each action is six, and at least five out of six of the attributes match, fuzzy logic can be used to accept two non-matching actions as equivalent and consider it a match for purposes of applying the above algorithm discussed with regard to FIGS. 3 and 4. If a match is accepted but one of the six attributes did not match, a wildcard is returned to the user for that particular action with the frequency of the actions behind that wildcard to indicate likely actions, as shown in step 520 of FIG. 5.

The fitting alignment features discussed above with regard to the algorithm illustrated by FIGS. 3-5 utilize principles of the Smith-Waterman algorithm used in computational genomics. However, the implementations discussed in this disclosure go substantially beyond the previous implementations of the Smith-Waterman algorithm by implementing a version that can be used for multi-dimensional UI test telemetry of computer applications and implementing a fuzzy matching check to ensure that the system can be used with variation in test telemetry, as discussed above.

The implementations discussed above with regard to FIGS. 1-5 are an important step forward in the area of UI testing telemetry of computer applications, and related fields, particularly regarding the field of development operations (DevOps). Regarding this, the features discussed herein of using a fitting alignment of pairs of action sequences to eliminate irrelevant action sequences and identify multiple divergent critical sequences that can lead to a crash or other event of interest, delivers critical insights for a user to view a set of sequences that are likely to have generated the crash, or other event, and are likely to recreate the crash or event. This allows software engineers to use UI testing telemetry at scale to quickly determine how to reproduce a crash, or other event under study, and narrow the scope of their investigation at the code level for issues that lead to the crash or event. This directly reduces engineering costs, due to reduced investigation time. It also increases the resolution rate of events such as crashes and reduces the mean time to resolution of crashes or other events under study in the product. This improves the quality of the product being sold to customers and their satisfaction with the product. As such, the implementations disclosed herein represent an important advance in DevOps pertaining to telemetry testing of software applications in that these implementations allow for reducing the time necessary to identify the source of unwanted events to improve the quality of the product at minimal cost, which are core principles of DevOps engineering.

UI testing telemetry and its analysis is a relatively new domain for the testing practice within the software development industry. As such, novel implementations, such as set forth in the present disclosure, must be developed to analyze the telemetry generated at scale and deliver valuable insight to investigating engineers. The implementations disclosed herein offer a concrete and unique solution that provides significant improvement when compared with existing methodologies for this problem space.

For example, as a step forward in the area of DevOps regarding testing telemetry, the implementations disclosed herein provide the ability to identify and remove irrelevant telemetry points and deliver critical sequences. For this purpose, the present implementations use a pairwise fitting alignment to insert gaps when non-matching actions are identified, and these gaps provide the implementations with ways to delete these non-matching actions. The basis for this aspect of the implementations is that non-matching actions are not critical to the action pathway that generates the crash or other event being investigated and can therefore be discarded. The implementation is robust enough to be able to identify and match actions undertaken at different points in their respective sequences, which naive algorithms are unable to complete. This allows for the delivery of critical sequences, using the techniques discussed above, which are immensely helpful in understanding how the product needs to be exercised to generate and reproduce the crash or other event under study. Critical sequences are a unique concept because they can a synthetic creation relative to the application under study. This means that even if the sequence was never undertaken by the testing agent or seen in the telemetry, the implementations disclosed herein can identify the critical sequences of actions of minimal length that have a high likelihood of generating the crash. This provides for an additional layer of intelligence to supplement the testing agent's capabilities.

The implementations disclosed herein also provide further improvements regarding DevOps pertaining to testing telemetry by providing the ability to identify multiple divergent critical sequences to generate a crash or other event under study. One of the key difficulties with certain crash investigations is when crashes can be generated through multiple divergent actions undertaken in the application. Without the knowledge that multiple pathways exist, any attempt at resolving the issue may lead to only a partial resolution. This leads to significantly more engineering resources spent after an initial patch to find alternative sources of the crash, a longer time to resolution for the issue, and a poorer quality product. The implementations disclosed herein delivers all likely critical sequences that will generate the crash. Beyond making it clear that each of the pathways must be handled to fully resolve the issue, it also makes it possible for the investigating engineer to draw insights about what may be common between the critical sequences at the code level of the application and redirect the engineer to focus on that area of the code.

The existing solutions in the field of UI telemetry testing require a manual review of thousands of potential actions lists and an even larger number of associated actions. Not only is this incredibly inefficient and time consuming, but it also leads to a large probability that any insight gained is inaccurate or incomplete. The implementations disclosed herein can examine thousands of actions lists and deliver critical sequences in a matter of seconds. This delivers a superior result in a significantly shorter timeframe with no manual intervention required, beyond the crash signature being investigated as an input.

Figure 6:
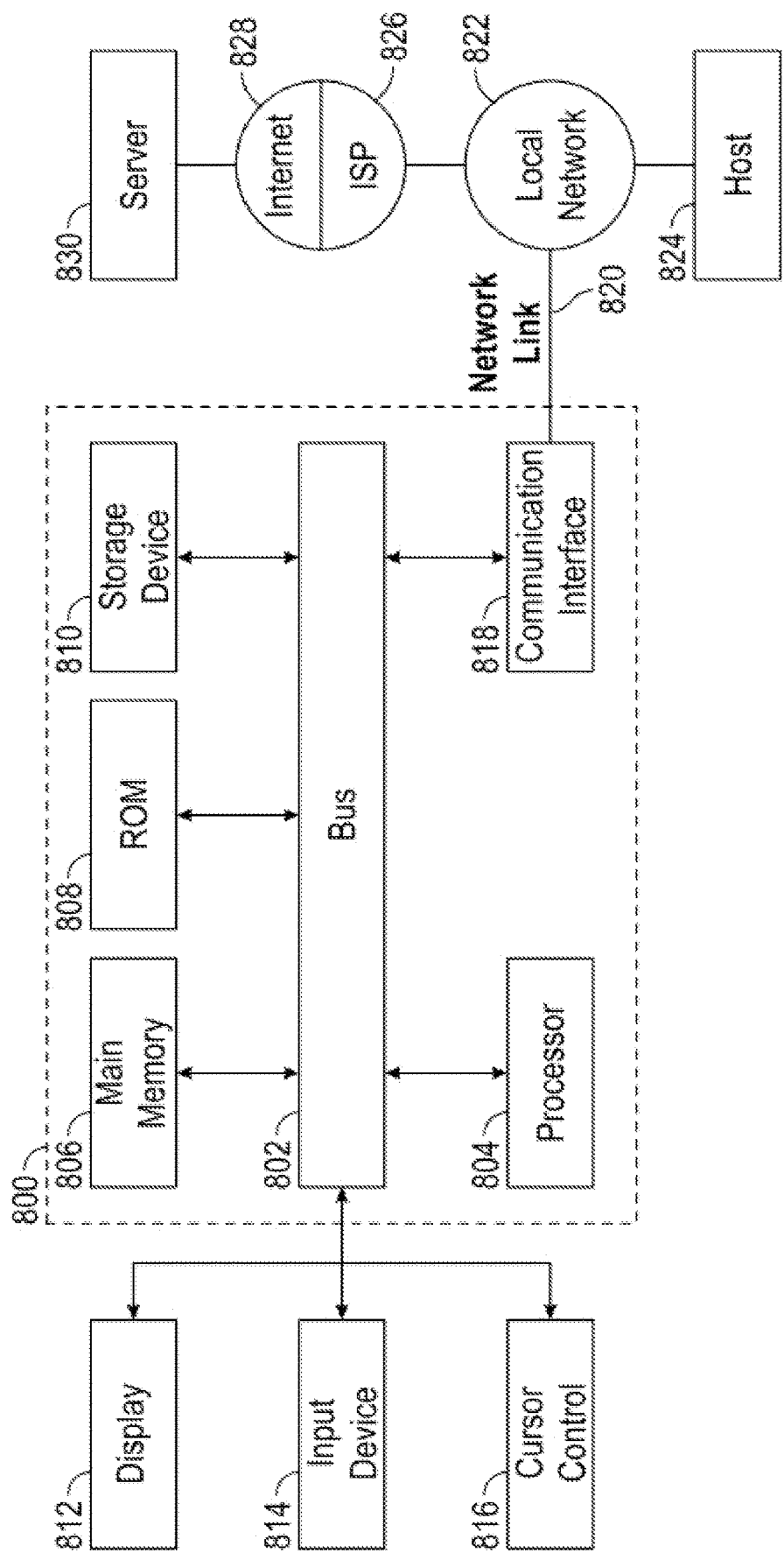
FIG. 6 is a block diagram showing an example computer system upon which aspects of this disclosure may be implemented.

FIG. 6 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, a computer for running the application 440, and servers for the cloud system 410.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A system which includes one or more processors, and one or more machine-readable media storing instructions which, when executed by the one or more processors, cause the one or more processors to collect a plurality of actions lists, each action list being comprised of an action sequence of actions performed by an application on the processor leading to a predetermined resulting event pertaining to the application, create a plurality of pairs of the action sequences, each pair of action sequences being comprised of a first action sequence and a second action sequence, for each pair of action sequences, apply a fitting alignment to create fitted action sequence pairs, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs, and delete data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

Item 2. The system of item 1, wherein the predetermined resulting event is one of a crash of the application, a hang of the application, performance degradation of the application, and error states of the application.

Item 3. The system of items 1 or 2 wherein the predetermined resulting event is a crash of the application.

Item 4. The system of any of items 1-3, wherein the instructions, when executed by the processor, cause the processor to trim each of the collected plurality of action sequences to a predetermined number of last N actions of each of the collected plurality of action sequences prior to applying the fitting alignment to each of the collected plurality of action sequences.

Item 5. The system of any of items 1-4, wherein the instructions, when executed by the processor, cause the processor to analyze a plurality of critical sequences of a plurality of the fitted action sequence pairs to determine how many different critical action sequences exist for the plurality of the fitted action sequence pairs and to determine how many of the plurality of critical action sequences are identical to one another for different ones of the plurality of fitted action sequence pairs, and apply importance scores, respectively, to the plurality of critical sequences based on a predetermined parameter of each of the determined critical sequences within the plurality of fitted action sequence pairs.

Item 6. The system of any of items 1-5, wherein the instructions, when executed by the processor, cause the processor to rank the critical sequences based the importance scores of the critical sequences, and to provide a list of the ranked critical sequences to a user.

Item 7. The system of any of items 1-6, wherein each of the actions is comprised of multi-dimensional data including a plurality of attributes for each of the actions.

Item 8. The system of any of items 1-7, wherein the instructions, when executed by the processor, cause the processor to perform the fitting alignment for each of the plurality of attributes of each of the first and second action sequences of each of the action sequences.

Item 9. The system of any of items 1-8, wherein the instructions, when executed by the processor, cause the processor to provide a wild card for at least one of the attributes of the first and second fitted action sequences which do not match one another.

Item 10. The system of any of items 1-9, wherein collecting of the actions list is performed as part of a user interface (UI) testing telemetry operation or an application programming interface (API) testing telemetry operation.

Item 11. The system of any of items 1-10, wherein the instructions, when executed by the processor, cause the processor to provide the list of the ranked sequences to a training mechanism configured to provide outputs to the processor for optimizing the operations of collecting the actions list, creating the pairs of action sequences, applying the fitting alignment and deleting the data to create the critical sequences based on information learned from the operations in creating the list of the ranked sequences.

Item 12. A method for collecting a plurality of actions lists, each action list being comprised of an action sequence of actions performed by an application on the processor leading to a predetermined resulting event pertaining to the application, creating a plurality of pairs of the action sequences, each pair of action sequences being comprised of a first action sequence and a second action sequence, for each pair of action sequences, applying a fitting alignment to create fitted action sequence pairs, respectively, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs, and deleting data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event Item 13. The method of item 12, wherein the predetermined resulting event is one of a crash of the application, a hang of the application, performance degradation of the application, and error states of the application.

Item 14. The method of any one of items 12-13, wherein the predetermined resulting event is a crash of the application.

Item 15. The method of any one of items 12-14, further including trimming each of the collected plurality of action sequences to a predetermined number of last N actions of each of the collected plurality of action sequences prior to applying the fitting alignment to each of the collected plurality of action sequences.

Item 16. The method of any one of items 12-15, further comprising analyzing a plurality of critical sequences of a plurality of the fitted action sequence pairs to determine how many different critical action sequences exist for the plurality of the fitted action sequence pairs and to determine how many of the plurality of critical action sequences are identical to one another for different ones of the plurality of fitted action sequence pairs, and applying importance scores, respectively, to the plurality of critical sequences based on frequency of occurrence of each of the determined critical sequences within the plurality of fitted action sequence pairs.

Item 17. The method of any one of items 12-16, further comprising ranking the critical sequences based the importance scores of the critical sequences and providing the ranked critical sequences to a user.

Item 18. The method of any one of items 12-17, wherein each of the actions is comprised of multi-dimensional data including a plurality of attributes for each of the actions, and further comprising performing the fitting alignment for each of the plurality of attributes of each of the first and second action sequences of each of the action sequences.

Item 19. The method of any one of items 12-18, further comprising providing a wild card for at least one of the attributes of the first and second fitted action sequences which do not match one another.

Item 20. A computer readable tangible storage media on which are stored instructions that when executed cause a programmable device to perform functions of collecting a plurality of actions lists, each action list being comprised of an action sequence of actions performed by an application on the processor leading to a predetermined resulting event pertaining to the application, creating a plurality of pairs of the action sequences, each pair of action sequences being comprised of a first action sequence and a second action sequence, for each pair of action sequences, applying a fitting alignment to create fitted action sequence pairs, respectively, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs, and deleting data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing detailed description, numerous specific details were set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising:
a processor; and
a machine-readable media storing instructions which, when executed by the processor, cause the processor to:
collect a plurality of actions lists, each action list being comprised of an action sequence of actions performed by an application on the processor leading to a predetermined resulting event pertaining to the application;
create a plurality of pairs of the action sequences, each pair of action sequences being comprised of a first action sequence and a second action sequence;
for each pair of action sequences, apply a fitting alignment to create fitted action sequence pairs, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs; and delete data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

2. The system of claim 1, wherein the predetermined resulting event is one of a crash of the application, a hang of the application, performance degradation of the application, and error states of the application.

3. The system of claim 1, wherein the predetermined resulting event is a crash of the application.

4. The system of claim 1, wherein the instructions, when executed by the processor, cause the processor to trim each of the collected plurality of action sequences to a predetermined number of last N actions of each of the collected plurality of action sequences prior to applying the fitting alignment to each of the collected plurality of action sequences.

5. The system of claim 1, wherein the instructions, when executed by the processor, cause the processor to:
analyze a plurality of critical sequences of a plurality of the fitted action sequence pairs to determine how many different critical action sequences exist for the plurality of the fitted action sequence pairs and to determine how many of the plurality of critical action sequences are identical to one another for different ones of the plurality of fitted action sequence pairs; and
apply importance scores, respectively, to the plurality of critical sequences based on a predetermined parameter of each of the determined critical sequences within the plurality of fitted action sequence pairs.

6. The system of claim 5, wherein the instructions, when executed by the processor, cause the processor to rank the critical sequences based the importance scores of the critical sequences, and to provide a list of the ranked critical sequences to a user.

7. The system of claim 1, wherein each of the actions is comprised of multi-dimensional data including a plurality of attributes for each of the actions.

8. The system of claim 7, wherein the instructions, when executed by the processor, cause the processor to perform the fitting alignment for each of the plurality of attributes of each of the first and second action sequences of each of the action sequences.

9. The system of claim 8, wherein the instructions, when executed by the processor, cause the processor to provide a wild card for at least one of the attributes of the first and second fitted action sequences which do not match one another.

10. The system of claim 1, wherein collecting of the actions list is performed as part of a user interface (UI) testing telemetry operation or an application programming interface (API) testing telemetry operation.

11. The system of claim 6, wherein the instructions, when executed by the processor, cause the processor to provide the list of the ranked sequences to a training mechanism configured to provide outputs to the processor for optimizing operations of collecting the actions list, creating the pairs of action sequences, applying the fitting alignment and deleting the data to create the critical sequences based on information learned from the operations in creating the list of the ranked sequences.

12. A method comprising:
collecting a plurality of actions lists, each action list being comprised of an action sequence of actions performed by an application on a processor leading to a predetermined resulting event pertaining to the application;
creating a plurality of pairs of the action sequences, each pair of action sequences being comprised of a first action sequence and a second action sequence;
for each pair of action sequences, applying a fitting alignment to create fitted action sequence pairs, respectively, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs; and
deleting data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

13. The method of claim 12, wherein the predetermined resulting event is one of a crash of the application, a hang of the application, performance degradation of the application, and error states of the application.

14. The method of claim 12, wherein the predetermined resulting event is a crash of the application.

15. The method of claim 14, further comprising trimming each of the collected plurality of action sequences to a predetermined number of last N actions of each of the collected plurality of action sequences prior to applying the fitting alignment to each of the collected plurality of action sequences.

16. The method of claim 15, further comprising:
analyzing a plurality of critical sequences of a plurality of the fitted action sequence pairs to determine how many different critical action sequences exist for the plurality of the fitted action sequence pairs and to determine how many of the plurality of critical action sequences are identical to one another for different ones of the plurality of fitted action sequence pairs; and
applying importance scores, respectively, to the plurality of critical sequences based on frequency of occurrence of each of the determined critical sequences within the plurality of fitted action sequence pairs.

17. The method of claim 16, further comprising ranking the critical sequences based the importance scores of the critical sequences and providing the ranked critical sequences to a user.

18. The method of claim 16, wherein each of the actions is comprised of multi-dimensional data including a plurality of attributes for each of the actions, and further comprising performing the fitting alignment for each of the plurality of attributes of each of the first and second action sequences of each of the action sequences.

19. The method of claim 17, further comprising providing a wild card for at least one of attributes of the first and second fitted action sequences which do not match one another.

20. A computer readable tangible storage media on which are stored instructions that when executed cause a programmable device to perform functions of:

collecting a plurality of actions lists, each action list being comprised of an action sequence of actions performed by an application on a processor leading to a predetermined resulting event pertaining to the application;

creating a plurality of pairs of the action sequences, each pair of action sequences being comprised of a first action sequence and a second action sequence;

for each pair of action sequences, applying a fitting alignment to create fitted action sequence pairs, respectively, wherein each of the fitted action sequence pairs is comprised of a first fitted action sequence and a second fitted action sequence having equal lengths to one another, wherein non-matching data between the first and second fitted action sequences of each pair of fitted action sequences is replaced with gaps to ensure that the first and second fitted action sequences are of equal length and are aligned with one another with the gaps being located at index positions of each of the first and second fitted action sequences corresponding to index positions of non-matching data in either of the first fitted action sequence and the second fitted action sequence of each of the fitted action sequence pairs; and deleting data, for each of the fitted action sequence pairs, corresponding to the gaps in either of the first and second fitted action sequences, to create a critical sequence of actions for each of the fitted action sequence pairs representing, respectively, common actions of the first and second fitted action sequences of each of the fitted action sequence pairs leading to the predetermined resulting event.

\* \* \* \* \*